Nov. 6, 1923.
F. H. BRINKERHOFF
1,473,173
DIFFERENTIAL DIAPHRAGM
Filed May 22, 1919
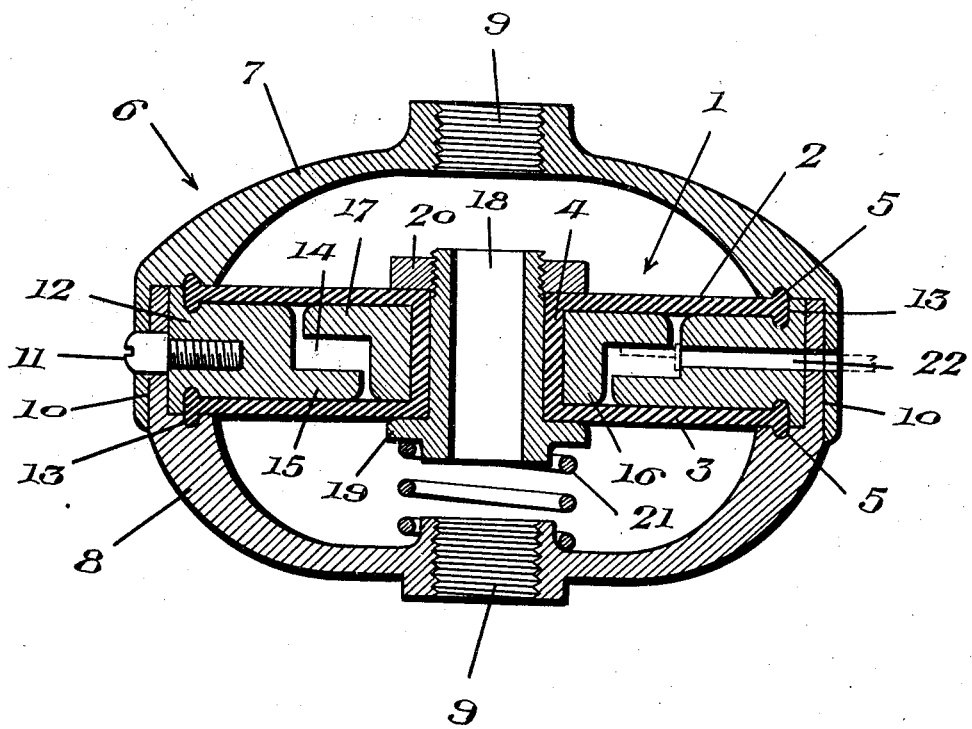
WITNESS:
INVENTOR.
F. H. Brinkerhoff
BY
W. J. Fitz Gerald & Co.
ATTORNEYS.

Patented Nov. 6, 1923.

1,473,173

UNITED STATES PATENT OFFICE.

FREDERIC H. BRINKERHOFF, OF CLINTON, IOWA.

DIFFERENTIAL DIAPHRAGM.

Application filed May 22, 1919. Serial No. 298,955.

*To all whom it may concern:*

Be it known that I, FREDERIC H. BRINKERHOFF, a citizen of the United States, residing at Clinton, in the county of Clinton and State of Iowa, have invented certain new and useful Improvements in Differential Diaphragms; and I do hereby declare the following to be a full, clear, and exact description of the invention, such as will enable others skilled in the art to which it appertains to make and use the same.

The present invention relates to diaphragms, and aims to provide a novel and improved diaphragm having new and useful advantages over diaphragms as commonly used and heretofore known.

The object of the invention is the provision of a diaphragm of novel construction, having a differential action due to the unequal areas thereof at opposite sides, having a hole or opening therethrough so that the fluid can pass through the diaphragm, and in order that the diaphragm can be disposed in a pipe or conduit through which the fluid flows that operates the diaphragm, and also having such form that leakage is avoided because the member or means operated by the diaphragm need not extend within or through the chamber or passage for the fluid.

It is also the object of the invention to provide such a diaphragm which is simple and inexpensive in construction, as well as efficient and practical in operation.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a diametrical section of the diaphragm construction.

The diaphragm 1 forming the subject matter of this invention can be used for many purposes, such as in tire alarms, pressure regulators, gas, air, water or steam gages, pressure gages, expansion valves for refrigerating apparatus, whistle valves, flushing valves, faucets, water control of gas valve in water heaters and the like. The diaphragm is illustrated in its simplest form, and it can of course be used in many ways, according to the conditions. The diaphragm is composed of rubber or other suitable material, and if built on large scale, may be of sheet metal. This diaphragm comprises opposite secondary diaphragms 2 and 3 which are substantially parallel, and each of which is provided with a central opening. The secondary diaphragms 2 and 3 have their inner edges connected to a neck 4, and the outer edges of the diaphragm sections 2 and 3 are provided with beads 5 for clamping them in place. Thus, the diaphragm 1 is of annular form and of U-shaped radial cross section with its edge portions or flanges extending outwardly away from the center to be clamped to the casing. The connecting neck 4 may be metal or other material to which the sections 2 and 3 are connected in any suitable manner.

The casing 6 as illustrated comprises the opposite dished sections 7 and 8 provided with the central openings 9 for the attachment of the adjacent ends of two pipes or conduits, whereby the casing can be disposed in the passage of the fluid so that it will pass through the diaphragm. The sections of the casing have the overlapping flanges or rims 10 which are secured together by one or more screws 11 or the like, and a ring 12 is fitted between the sections 7 and 8, and between the edge portions of the diaphragm 1. The sections of the casing and ring 12 are provided with grooves 13 in which the beads 5 are seated, to securely anchor the diaphragm to the casing and prevent leakage past the edges thereof. The casing may be of various constructions, however, to accommodate the diaphragm, but the construction shown permits of convenient assemblage and separation of the parts, it being noted that when the screws 11 are removed, the sections of the casing can be slipped apart, thereby releasing the diaphragm.

In order that the opposite portions or sections 2 and 3 of the diaphragm will have active areas of different diameters or dimensions, the ring 12 is provided with an annular recess or rabbet 14 at one side of its inner edge, providing a lip 15 against which the diaphragm section 3 bears, and permitting a greater portion of the diaphragm section 2 to flex into the opening of the ring 12 than the diaphragm section 3. Thus, the inner edge of the ring 12 is formed to permit a greater area or portion of the diaphragm section 2 to flex than the diaphragm section 3, thus providing a differential action with the same pressure of fluid in the casing 6 at the opposite sides of the diaphragm, the pressure acting against a greater area on one side of the diaphragm than at the other, and the greater the pressure on both sides, the greater will be the tendency to move the center of the diaphragm toward the weaker side.

A ring or collar 16 is fitted snugly within the diaphragm 1 around the neck 4 between the sections 2 and 3, and is movable within the lip 15. The collar 16 has a flange or lip 17 bearing against the diaphragm section 2 and extending into the recess 14. This collar maintains the central portion of the diaphragm in place, and prevents the pressure from collapsing the diaphragm as would otherwise occur, especially when the diaphragm is composed of rubber, or other like material. It is also preferable to extend a tubular core member 18 through the neck 4, same being provided at one end with a flange 19, and at its other end with a nut 20, to clamp the central portion of the diaphragm against the collar 16, and thus provide a rigid central construction for the diaphragm with an opening or hole therethrough through which the fluid can flow from one opening 9 to the other.

A coiled wire expansion spring 21 is confined between the casing section 8, and member 18, to normally move the diaphragm toward the side which has the greatest active area, so as to resist the displacement of the central portion of the diaphragm under pressure, and thus yieldingly resist the movement of the diaphragm proportional to the increase in pressure. Any other suitable spring can be used for this purpose.

The motion of the diaphragm can be transmitted therefrom in any suitable way, but is preferably transmitted through an opening 22 provided in the flanges 10 and ring 12, so that the motion transmitting means can extend from the diaphragm to the outside without passing through the fluid, and without the need of packing, stuffing boxes, and the like. The motion can be transmitted by the flow of fluid through the opening 22, or any suitable mechanical device can be extended through said opening to be operated by the flange or lip 17 in its movement with the diaphragm. Inasmuch as the mode of transmitting the diaphragm can be of different forms and arrangements, no specific means need be shown or described as the present invention resides in the diaphragm construction as such.

With the present construction, it will be noted that the fluid can flow through the diaphragm, and as the pressure increases, the preponderance of pressure against the diaphragm section 2 will move the diaphragm toward the spring 21, and the movement of the diaphragm will be proportional to the pressure in the casing, because of the resistance offered by the spring 21. When the pressure decreases, the spring 21 will return the diaphragm accordingly. The motion transmitting means can extend from within the diaphragm out between the edges thereof without the need of packing, stuffing boxes, or the like, so that there will be no danger of leakage and both edges of the diaphragm are clamped to the casing so that the diaphragm rubber or other material is not penetrated or otherwise subject to leakage.

Having thus described the invention, what is claimed as new is:—

1. A device of the character described embodying a casing, and a diaphragm composed of one piece of rubber or similar material and of annular form and U-shaped radial section having its edge portions extending outwardly away from the center and secured to the casing, the central portion of said diaphragm providing an opening through the diaphragm for the flow of fluid in the casing past the diaphragm, provision being made for the control of a medium by the movement of said central portion of the diaphragm, and the diaphragm having opposite side portions having different areas of flexure.

2. A device of the character described embodying a casing, and a diaphragm having spaced sections and a neck between them, the edge portions of said sections being secured to the casing, the casing having openings at opposite sides of said diaphragm for the inlet and outlet of fluid to pass through the casing, said neck of the diaphragm providing an opening through the diaphragm through which the fluid can flow, the sections of the diaphragm having different areas of flexure, and provision being made for the control of a medium by the movement of said neck.

3. A diaphragm of annular form and U-shaped radial cross section with a central opening through the diaphragm, and a collar fitting snugly in the diaphragm around the central portion thereof and having portions of different diameters bearing against the opposite sides of the diaphragm.

4. A diaphragm of annular form and U-shaped radial section having a central neck and outwardly projecting portions, a collar surrounding said neck and bearing against the opposite portions of the diaphragm, and a tubular core member extending through said neck and having means clamping the opposite sides of the diaphragm to said collar, said core member affording the passage of fluid through the diaphragm.

5. A device of the character described embodying a casing having opposite sections, a ring between said casing sections, a diaphragm of annular form and U-shaped radial cross section having a central neck and outwardly extending edge portions, said edge portions of the diaphragm being clamped between said ring and casing sections, said ring having a recess at its inner edge at one side permitting a greater portion of one side of the diaphragm to flex within the opening of the ring than the other, a collar within the diaphragm surrounding said neck having a flange extending within said recess, a tubular core member extending through said neck and having means for clamping the diaphragm to said collar, and a spring between said member and casing.

6. A device of the character described embodying a casing, a diaphragm of annular form and U-shaped radial cross-section having a central neck with an opening therethrough for the passage of fluid through the diaphragm, the edge portions of the diaphragm extending outwardly and secured to the casing, the casing having openings at opposite sides of the diaphragm for the inlet and outlet of the fluid to pass through the opening of the diaphragm, and the casing having an opening leading from between the edge portions of the diaphragm for the passage of a medium into the casing to be controlled by the diaphragm between the edge portions thereof.

7. A device of the character described embodying a casing, a diaphragm of annular form and U-shaped radial cross-section within the casing having a central neck and outwardly extending edge portions, a ring between the edge portions of the diaphragm and clamped therewith within the casing, said ring having a recess at the inner edge at one side permitting a greater portion of one side of the diaphragm to flex within the opening of the ring than the other side, and a collar at the central portion of the diaphragm between the opposite sides thereof having a flange extending within said recess and bearing against the first named side of the diaphragm.

8. A device of the character described embodying a casing, a diaphragm having spaced sections and a neck between them forming an opening through the diaphragm, the edge portions of the sections being secured to the casing, said casing having openings at opposite sides of said diaphragm for the inlet and outlet of fluid to pass through said opening of the diaphragm, one section of the diaphragm having a greater area of flexure than the other section and the casing having an opening between the edge portions of the diaphragm sections for the passage of a medium between the diaphragm sections to be controlled by the movement of the diaphragm.

In testimony whereof I have signed my name to this specification in the presence of two subscribing witnesses.

FREDERIC H. BRINKERHOFF.

Witnesses:
 EMMA G. FORT,
 F. M. FORT.